Patented Mar. 23, 1943

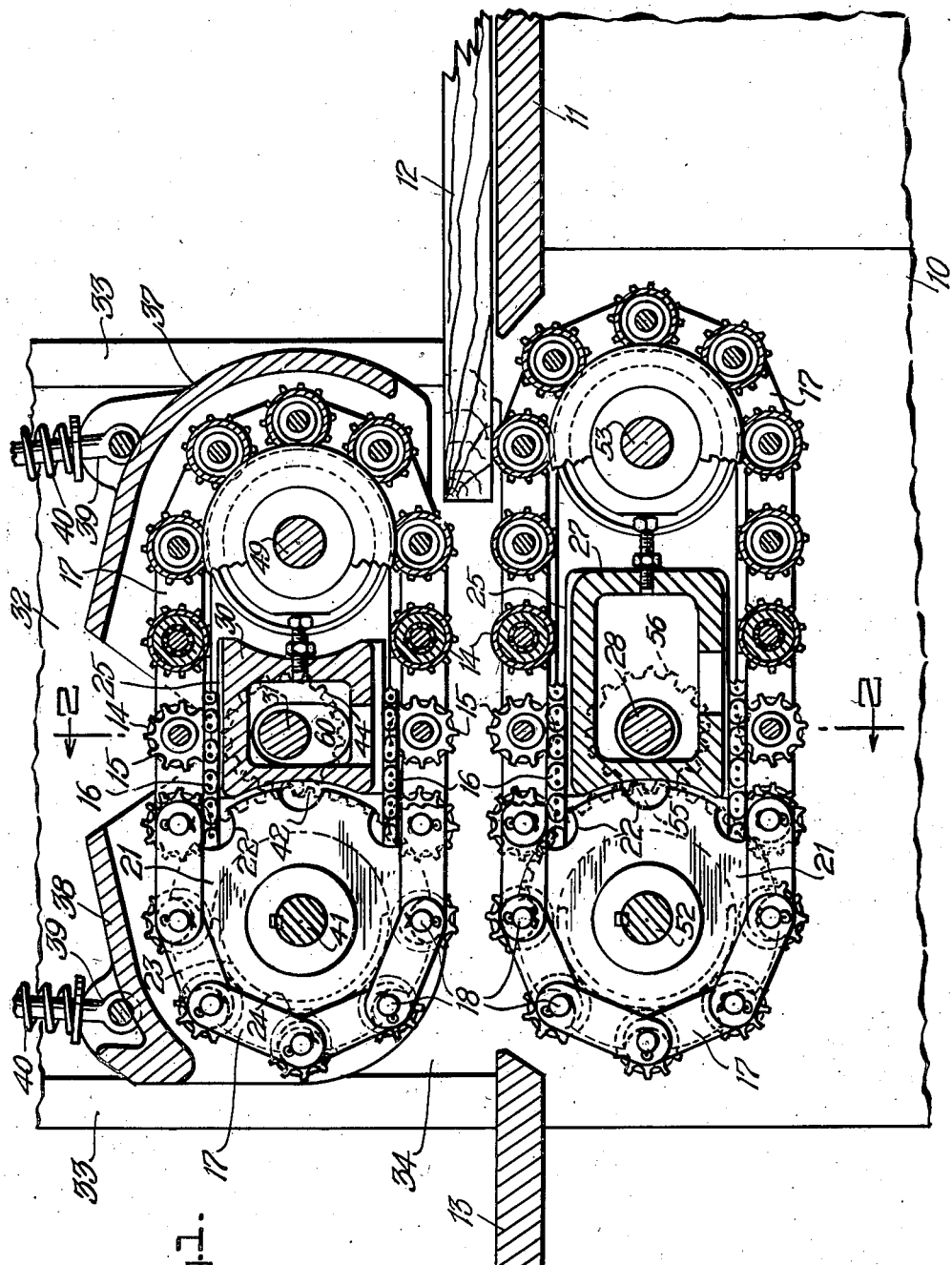

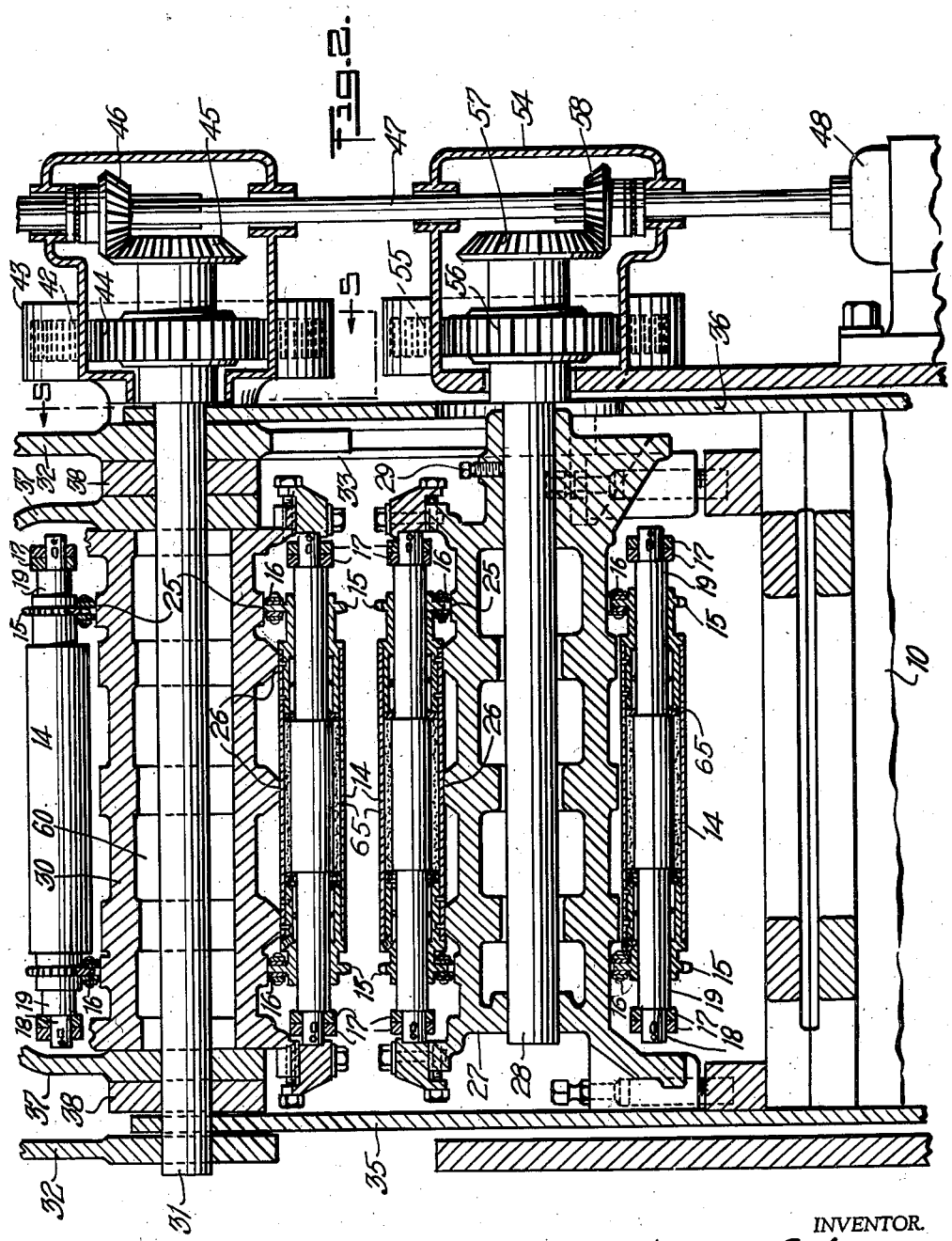

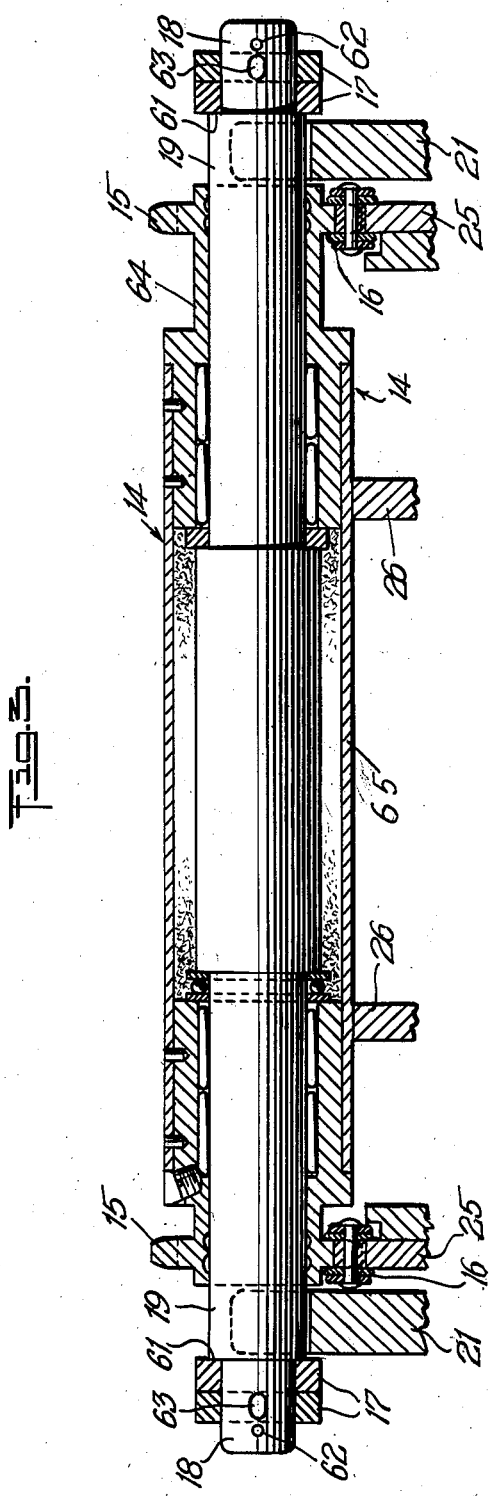
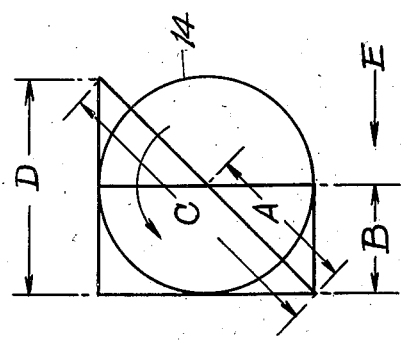

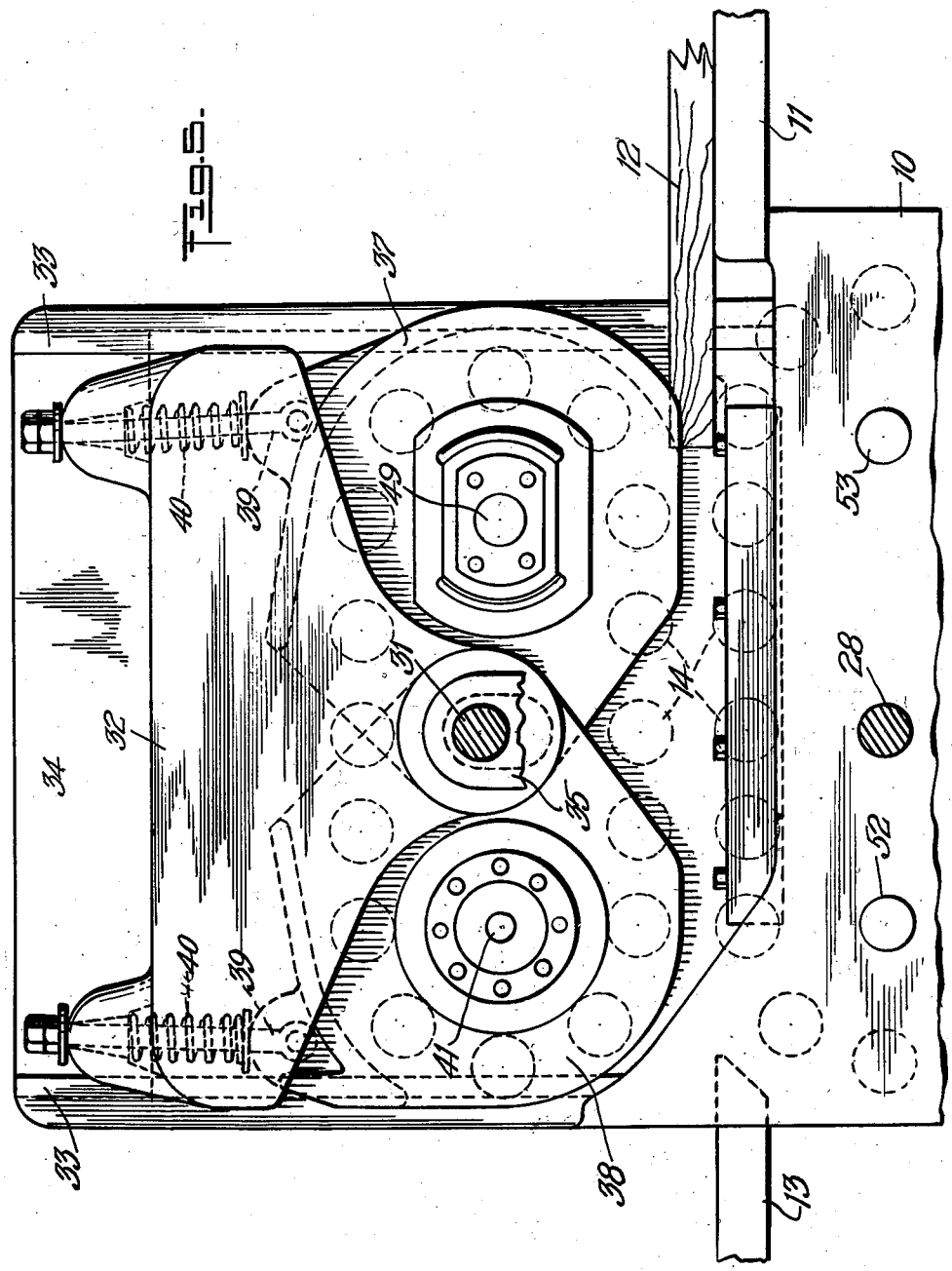

2,314,605

UNITED STATES PATENT OFFICE 2,314,605

WORK FEEDING MECHANISM

William O. Arnold, Turtle Township, Rock County, Wis.

Application May 15, 1941, Serial No. 393,658

7 Claims. (Cl. 198—162)

This invention relates to work feeding mechanisms, and more particularly to such a mechanism employed in connection with other machines for feeding work, such as flat stock of wood, metal or other material to said machines. The present invention is directed to the feeding mechanism irrespective of the character of operation to be performed upon the work, and accordingly no attempt is here made to show or describe any particular machine to which the work is fed.

Work feeding mechanisms heretofore employed have generally utilized lag-bars connected chainwise with links, the lag-bars engaging and traveling with the work at the same speed as the work. These lag-bars, in turn have been in contact with and slide upon bed ways or tracks. The feeding pressure has been applied through the lag-bars and considerable friction develops between such lag bars and their ways or tracks.

Furthermore, the tendency of present-day practice is to feed work through a machine at the greatest possible speed, and generally is stepped up to a speed faster than proper for the design of machine owing to the limitations of construction and wear. This is particularly true in endless bed construction of the prior art type mentioned, for the high linear speed of the endless bed lag-bars on the bed ways causes great wear on those parts, as well as on the pins, pin holes and links used for linking the bars together.

Objects

The present invention has been evolved to overcome the shortcomings of the mentioned or conventional type of prior art endless beds and among the principal objects which the invention has in view are to provide a frictionless form of endless bed; to provide an endless bed which may be supported and driven with practically no frictional wear; to provide a construction wherein the stock or work is more positively engaged on opposite sides at directly opposite parts thereof; to provide an endless bed utilizing rolling motion; to propel the work through the feeding mechanism faster than the linear transition of the feeding bed as a whole; to avoid transfer of work-engaging pressures through rotating bearings; to utilize rollers both for receiving such pressures and for advancing the work; to provide upper and lower rollers directly opposite each other while feeding the work and synchronized to feed forward at identical speeds; to maintain maximum tractive engagement of the rollers with the work; to provide for ready entry of the work between opposed rollers; to accommodate different thicknesses of work and irregularities in thickness thereof; to secure simplicity of construction and operation; and to obtain other advantages and results as may be brought out in the following description.

Drawings

For purposes of disclosure of the generic invention, one species thereof is herein illustrated, and by way of example and not by way of limitation, the selected disclosure is represented in the several views of the drawings wherein like numerals of reference indicate similar parts throughout the several views, and wherein Figure 1 is a longitudinal section of a work feeding mechanism with a piece of work about to enter between opposed rollers;

Figure 2 is a transverse section on line 2—2 of Fig. 1;

Figure 3 is a similar transverse section, on a scale greater than in Fig. 2, and showing the driving or master sprockets and non-rotating guide discs associated with a roller;

Figure 4 is a diagrammatic view illustrative of movement of a roller and its feeding relationship to the work by which the work is given linear speed and movement twice as great as the linear speed and movement of the bed; and Figure 5 is a sectional elevation on line 5—5 of Fig. 2.

Description

In the specific embodiment of the invention illustrated in said drawings, the reference numeral 10 represents a base providing a table 11 for supporting material, such as piece of wood 12 shown, which is to be fed forward and received by some other machine or support designated generally by receiving table 13. For convenience, the end of the machine where the first said table 11 is shown will be referred to as the in-feed end, whereas the opposite end where the work discharges and where the receiving table 13 is shown will be referred to as the out-feed end. Between the in-feed end and the out-feed end of the construction illustrated, are provided upper and lower beds. Said beds are of a continuous type and quite similar to each other, and constitute the essential feature of the present invention. Broadly speaking, the said beds differ from prior art continuous types of feeding mechanism, in that I provide a plurality of work engaging rollers which impart to the work a speed and linear transition double the linear speed and transition of the bed as a whole. This may be explained by reference to Figure 4, wherein the circle is representative of a roller. The bottom tangent line of length B may be considered a unit distance which happens to be here shown but does not have to be equal to the roller radius. When the roller rolls forward this unit distance B, the center of the roller has made a linear transition of a unit distance, but since the bottom tangential point of engagement acts as the fulcrum, an upper tangential point diametrically opposite from the fulcrum will move twice as far as the center of the roller. Consequently, forward linear transition of the roller resultant from rolling on a bottom tangent, will advance an upper tangent rolled by engagement thereat, twice the distance B, and here indicated as D.

The present invention accordingly provides a plurality of rollers 14 which are required to roll upon a tangent diametrically opposite to and parallel to the work 12. Forward transition of the rollers due to rolling on said tangent accordingly obtains double that amount of transition effective upon the work. Applying these general terms more specifically by consideration of only the upper reach of the lower bed for the moment, it will be observed that next the ends of rollers 14 are sprockets 15 of a pitch diameter equal to the diameter of the rollers. A fixed sprocket chain 16 underlies the several sprockets. Separate from the said sprocket chains are a plurality of links 17 connecting hub portions 18 of the roller axles 19 in succession. These links pull the rollers along, but by virtue of the fixed chains 16 and sprockets 15, forward movement of the rollers results in the sprockets "walking" forward on the chains, thereby rolling the rollers on their bottom tangents. Since, as above explained, an upper point on the roller circumference moves twice as fast and twice the distance of the linear transition of the roller.

Continuing the more detailed description of the lower movable bed, it will be observed the same is comprised of a continuous series of the rollers and connecting links providing upper and lower reaches and passed around the opposite ends of a suitably constructed bed frame at the out-feed end of which are driving sprockets 21, 21. Said sprockets have appropriate notches 22 at their circumferences for receiving the successively approaching axles 19 for carrying the axles, rollers and associated parts around the end turn of the movable bed from one reach thereof to the other.

Correspondingly situated at both ends of the bed are fixed semi-circular mountings 23 for supporting the fixed sprocket chains 16 to pass them around the ends of the bed and maintain contact of the roller sprockets 15 therewith as the said rollers and their sprockets 15 pass from one reach to the other on a return portion of the path or orbit of travel. Semi-circular ways 24 are also provided as engaging tracks for the rollers as they are rolled along the return portion of the orbit. Straight-away supports 25 for the fixed sprocket chains and straight-away tracks 26 for the rollers are provided for each reach between the in-feed and out-feed semi-circular supports and ways. These straight-away supports and tracks are formed as integral parts of a movable bed frame 27 which lies in the space between the upper and lower reaches of the traveling portion of the bed and between the large sprockets at the ends of the reaches. At a mid-part of this bed frame 27, parallel to the rollers aforementioned is an axle bar 28 which is fixed with respect to said bed frame, as by set screw 29. It may be here noted that this axle bar projects at the rear of the machine (see Figure 2) and constitutes an axle upon which certain gears revolve as will appear more fully hereinafter.

The upper bed provides upper and lower reaches for its traveling portion, with rollers, links, sprockets and sprocket chains as previously described for the lower bed. It also provides a bed frame 30 within the area between the reaches thereof. Said upper bed frame also provides straight-away sprocket chain mountings 25 and tracks 26. Semi-circular mountings 23 for the sprocket chains and ways 24 for the rollers to follow around the end turns for the traveling portion are also provided.

At a mid-part of this upper bed frame 30 is an axle bar 31 substantially above and parallel to the aforementioned axle bar of the lower bed. Like the lower axle bar, the upper axle bar likewise is non-rotatable and projects at the rear of the machine for constituting an axle upon which certain other gears revolve as will also appear hereinafter. The upper axle bar also projects a distance at the front of the machine beyond the forward end of the bed frame. This upper axle bar 31 is hung near opposite ends in a hoist bracket 32 which has the general cross sectional shape of an inverted U with the leg toward the front side of the machine shorter than the rear leg, and the side edges of the rear leg slidable vertically in vertical ways formed by gibs 33 on the front side of and in conjunction with a fixed stand 34 projecting upwardly from the rear part of base 10.

Support for the upper axle bar 31 and hoist bracket 32 is obtained by a pair of hoist bars, one of which, 35, is at the front of the machine and the other 36, at the back thereof, and each shown immediately behind the respective front and back leg of the hoist bracket. Axle bar 31 passes through both of the hoist bars, and substantially fits openings in said hoist bars for that purpose, whereby vertical movement of the hoist bars obtains corresponding movement of the axle bar and hoist bracket. Suitable means (not shown), at the bottom of the hoist bars obtains an equalized control thereof for enabling the operator to raise or lower said bars and connected parts to enable the upper bed to be adjusted to the thickness of work presented to the machine. In passing, it may be also stated that the equalized control also includes a resilient take-up for necessary give for the mounting thereby of the upper bed. Allusion to this resilient mounting will be made later in this description.

Also carried by the aforementioned axle bar 31 are overlapping ends of in-feed and out-feed yokes 37, 38. Side arms of each yoke are pivotally carried on the axle bar, those toward the rear being next adjacent the inside of the hoist bracket and those at the front being next to and just to the rear of the front hoist bar. The in-feed yoke extends from said axle bar toward the in-feed end of the machine whereas the other or out-feed yoke extends from the axle bar toward the out-feed end. The ends of each yoke away from the axle bar are slung from eye-bolts 39 pivoted thereto and which pass upwardly through shoulders on the hoist bracket 32. Springs 40 on each eye bolt between the said yoke and hoist bracket will permit a restrained upward swing of each yoke as may become necessary in operation and under impetus of work passing through the machine.

Each of yokes 37 and 38 has crosswise thereof so as to be parallel to the central axle bar 31, an axle member carried next its opposite ends in side flanges of the respective yokes and at approximately the same level as said central axle bar. The axle member 41 at the out-feed end of the conveyor is preferably a driving shaft for the conveyor, and is shown as mounting the pair of said large sprockets thereon and appropriately secured, as by keys or splines, with respect to said sprockets so as to rotate the sprockets from the axle or shaft 41. Also on said axle or shaft, but fixed so as not to rotate therewith, and situated next to the said sprockets at the inwardly facing sides thereof are a pair of the aforementioned stationary sprocket chain supports 23, and at intervals therebetween are the said semi-circular ways 24 for the rollers. These ways likewise are non-rotatable and accordingly the semi-circular supporting and guiding portions of the supports and ways retain their appropriate relationship to the bed frame and its sprocket chain supports 25 and roller tracks 26 notwithstanding rotation of the axle member or shaft.

Said axle member or shaft 41 constitutes a driving shaft for the large sprockets, and for that purpose said shaft has at one end, outside the yoke flange and hoist brackets, a large gear 42 here shown substantially the same diameter as the large sprocket. Said gear is also fast with respect to the shaft 41 and is shown situated within a gear casing 43. Also in said casing is a pinion 44 in mesh with said gear 42 and mounted rotatably on the central axle bar 31. As one disclosure of driving means, said pinion is shown directly connected to a bevel gear 45 likewise rotatable on said axle bar at the outer end thereof. Said bevel gear 45 may be referred to for convenience as vertically disposed, and as in mesh with a horizontally disposed mating bevel gear 46 shown splined upon a vertical shaft 47, which, for purposes of this disclosure may be referred to as the main drive shaft. A vertical motor 48 is shown as the selected source of power for operating the machine.

The vertical drive shaft does not move in a longitudinal direction, but when the upper bed is moved in that direction, the gear case 43 and contained gears move bodily, said horizontal bevel gear sliding on the vertical shaft even while being rotated by virtue of the spline connection. It may also be here noted that while the central axle bar 31, carries with it, when moved vertically, the entire hoist bracket, said axle bar also constitutes a pivotal mounting for the yokes and the gear case. The out-feed end of the gear case and out-feed yoke may be swung by virtue of that pivotal mounting, and of course the out-feed axle passes through the hoist bracket with appropriate slot clearance to permit such swinging of yoke, out-feed axle and gear case with respect to the bracket.

The in-feed yoke likewise has an axle member 49, but there being no necessity for driving this axle, the same may be fixed with respect to the yoke and no large sprockets are needed and none are shown thereon. Since this axle member does not rotate, the semi-circular mountings 23 for the roller-driving sprocket chains and the semi-circular roller ways may be secured to this axle member so as to be mounted in fixed or non-rotatable position. Furthermore, since no driving gear is required for this in-feed axle member, it does not project through the hoist bracket as was the case when describing the out-feed axle member. In these respects, therefore, the in-feed axle member 41 and out-feed axle member 49 differ from each other, but each is mounted in the swinging end of its respective yoke.

While I have shown the lower bed in Figure 2 as having a leveling adjustment, it may be considered for purposes of this invention as substantially fixed in its vertical disposition. It does, however, provide a continuous conveyor construction of rollers linked together from hub to hub and carried around the semi-circular end orbits, and with large sprockets at the out-feed end as was described with respect to the upper bed. Like numerals of reference accordingly apply with respect to those parts and further detailed description thereof is deemed unnecessary. The lower bed of course requires no yokes or hoist bracket, but does employ a bed frame 27 with straight-away sprocket chain supports and straight-away rollers ways as before. The lower bed frame in distinction from the upper bed frame construction, may conveniently provide support for end portions of its central axle bar 28 and also for an outfeed axle member 52 and infeed axle member 53 all of which are parallel and at substantially even level.

As was described with respect to the upper bed, the out-feed axle member 52 of the lower bed is driven and drives the out-feed large sprockets by direct attachment. The said out-feed axle 52 projects at the rear of the machine into a gear case 54 and has secured thereto in said case, a large gear 55. That gear is in mesh with a pinion 56 rotatable on the end portion of central axle bar 28. Directly connected to pinion 56 and also rotatable on the said axle bar 28 is a vertical bevel gear 57 in turn in mesh with a horizontal bevel gear 58 shown splined onto the aforementioned vertical drive shaft 47. Both continuous traveling portions of the beds will accordingly be driven synchronously at the same speeds. It may here be noted that the rollers of the lower reach of the upper bed conveyor are directly above the rollers of the upper reach of the lower bed conveyor, and by virtue of the synchronization of drive, that desideratum prevails at all times. The upper conveyor is, however, shorter than the lower conveyor so that the work will rest upon an alined roller of the lower bed in advance of receiving the "bite" of a pair of juxtaposed rollers.

Inasmuch as the lower bed provides a fixed sprocket chain 16 corresponding to the fixed chain of the upper bed, and all rollers have sprockets of equal pitch diameter as the rollers, and in mesh with the sprocket chains, all of the sprockets will "walk" along the chains and obtain positive rotation of the rollers. The construction, as heretofore explained, obtains double speed or advancement of the work to a given speed or advancement of the conveyors. At the same time the rollers pass the pressure normal to the work in the same normal direction directly to the tracks or ways on which they are rolling.

When work enters at the infeed end of the machine between the conveyors, the in-feed yoke swings up enough to accommodate reception of the work by virtue of give of spring 40 on eyebolt 39. The bed frame 30, being mounted on both the in-feed and out-feed axle members, but passing the central axle bar 31 with freedom of movement exemplified by vertical slot 60, when lifted at its front end by entry of the work, fulcrums on the out-feed axle member. Then, as the work advances, the pressure exerted by the work lifts the out-feed end of the conveyor, thereby swinging the out-feed yoke and swinging the out-feed end of the frame using the in-feed axle member as a fulcrum. When the work is of greater thickness than can be accommodated by the swinging of the yokes as just described, the entire bed will rise by virtue of the slidable mounting of the hoist bracket and resilient support provided for the hoist bars.

The roller 14, shown in detail in Figure 3 preferably provides its hub and axle portions 18, 19 as stepped portions of an integral member. The links 17 are limited in inward movement along the axle by engagement with a shoulder 61 consequent upon the stepped construction, and are prevented from outward displacement by a pin or other means 62. A key or other means 63 between the hub and one link keeps the axle from rotating. Roller sprockets 15 are spaced inward from the shoulder 61 and links to provide exposed engaging area of axle for engagement for a period of each cycle by the driving large sprocket 21. Next inward from the sprocket is a sleeve 64 fast with respect to the small sprocket and both the small sprocket and sleeve being rotatable on the axle. Extending from sleeve to sleeve, concentric with the axle is a shell 65 suitably made fast with respect to the sleeve. The length and disposition of the sleeves is such that it will be juxtaposed in its travel upon the ways or tracks of the bed frame and will receive and transmit diametrically the pressure normal to the work. The sleeve affords space for packing the roller with grease, which, with suitable bearings, may be employed for reducing friction.

I claim:

1. A work feeding mechanism comprising a lower bed having work propelling means, an upper bed having similar work propelling means, said upper bed having a central axle bar crosswise thereof and loosely disposed with respect thereto, pivoted yokes mounting said bed from said axle bar, and a hoist bracket receiving end portions of said axle bar for mounting and guiding the same in vertical movement.

2. A work feeding mechanism comprising a lower bed having work propelling means, an upper bed having similar work propelling means, said upper bed having a central axle bar crosswise thereof and loosely disposed with respect thereto, pivoted yokes mounting said bed from said axle bar, and a hoist bracket and hoist bars receiving end portions of said axle bar for mounting and guiding the same in vertical movement.

3. A work feeding mechanism comprising a lower bed having work propelling means, an upper bed having similar work propelling means, said upper bed having a central axle bar crosswise thereof and loosely disposed with respect thereto, pivoted yokes mounting said bed from said axle bar, a hoist bracket receiving end portions of said axle bar for mounting and guiding the same in vertical movement, and resilient means interposed between the hoist bracket and yokes for retaining said yokes in normal relative position with respect to said hoist bracket.

4. A work feeding mechanism comprising upper and lower bed frames, a plurality of rollers for each bed frame and in surface rolling contact with said frame, said rollers next to the ends having sprockets of a pitch diameter equal to the diameter of said rollers where they ride on said frame, fixed sprocket chains underlying said sprockets, a plurality of links separate from said sprocket chains connecting said rollers in succession for impelling said rollers with a forward lineal transitional movement by said links and said rollers providing work engaging circumferential portions and advancing the work at double or more the speed of transition of said lineal movement of the rollers as the sprockets engage the sprocket chains, said sprockets on the rollers having walking action with respect to the bed for positively rotating the rollers at the rolling rate of the rollers rolling directly on the frame as said rollers move forward.

5. A work feeding mechanism comprising upper and lower bed frames, a series of linked together rollers for each bed frame, said rollers having means for impelling the rollers in a forward rolling and lineal transitional movement by said links and said rollers providing work-engaging cylindrical faces advancing the work at double the speed of transition of said lineal movement of the rollers, tracks on said bed frames paralleling the path of the work between series of rollers, the cylindrical work-engaging faces of said rollers having portions thereof in rolling engagement with and rolling directly on said tracks, and fixed means underlying said roller impelling means with said roller impelling means engaging the said fixed means whereby the links pulling the rollers impart a forward rolling action of the rollers on said tracks of the bed.

6. A work feeding mechanism comprising upper and lower bed frames, a series of linked together rollers for each bed frame, said rollers having means for impelling the rollers in a forward rolling and lineal transitional movement by said links, and said rollers providing work-engaging cylindrical faces advancing the work at double the speed of transition of said lineal movement of the rollers, tracks on said bed frames paralleling the path of the work between series of rollers, the cylindrical work-engaging faces of said rollers having portions thereof in rolling engagement with and rolling directly on said tracks, and fixed sprocket chains underlying said roller impelling means with said roller impelling means engaging the said sprocket chains whereby the links pulling the rollers impart a forward rolling action of the rollers on said tracks on the bed.

7. A work feeding mechanism comprising upper and lower bed frames, a series of linked together rollers for each bed frame, said rollers having next to the ends thereof sprockets of a pitch diameter equal to the diameter of the work-engaging cylindrical faces of the rollers, fixed sprocket chains underlying said sprockets and in operative engagement therewith, a plurality of links separate from said sprocket chains connecting said rollers in succession for impelling said rollers with a forward rolling and lineal transitional movement, and the work-engaging cylindrical faces of the rollers advancing the work at double the speed of transition of said lineal movement of the rollers, said bed frames providing tracks in direct contact with portions of said work-engaging cylindrical faces of the rollers and on which said rollers roll.

WILLIAM O. ARNOLD.